(12) United States Patent
Senapaty et al.

(10) Patent No.: US 10,365,949 B2
(45) Date of Patent: Jul. 30, 2019

(54) LARGE-SCALE ASYNCHRONOUS EVENT PROCESSOR

(71) Applicant: Dropbox, Inc., San Francisco, CA (US)

(72) Inventors: Shashank Senapaty, San Francisco, CA (US); Bashar Al-Rawi, San Francisco, CA (US); Peng Kang, San Francisco, CA (US); Rajiv Desai, Sunnyvale, CA (US); Daisy Luo Zhou, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 120 days.

(21) Appl. No.: 15/828,068

(22) Filed: Nov. 30, 2017

(65) Prior Publication Data

US 2019/0065246 A1 Feb. 28, 2019

Related U.S. Application Data

(60) Provisional application No. 62/549,914, filed on Aug. 24, 2017.

(51) Int. Cl.
*G06F 9/54* (2006.01)
*G06F 9/48* (2006.01)
*G06F 9/50* (2006.01)

(52) U.S. Cl.
CPC .......... *G06F 9/4881* (2013.01); *G06F 9/5088* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 9,990,389 B1* | 6/2018 | Zenger | G06F 16/235 |
| 2013/0238356 A1* | 9/2013 | Torii | G06Q 10/06 705/2 |
| 2016/0170814 A1* | 6/2016 | Li | G06F 9/542 719/318 |
| 2019/0058772 A1* | 2/2019 | Ruiz-Meraz | G06F 16/9535 |

* cited by examiner

*Primary Examiner* — Philip Wang
(74) *Attorney, Agent, or Firm* — Hickman Palermo Becker Bingham LLP; Adam C. Stone

(57) ABSTRACT

A large-scale asynchronous processor of events in a distributed and parallel processing environment. The processor includes a plurality of processes executing on a plurality of interconnected processors. The plurality of processes including a frontend process, a plurality of dispatcher processes, a plurality of job queues, and a plurality of worker processes. The frontend process is for receiving event notification remote procedure calls from one or more event sources and for publishing event notifications, based on the received calls, to topics of a distributed streaming platform. The plurality of dispatcher process are for consuming event notifications from the topics and for en-queuing jobs, based on the consumed event notifications, to the plurality of job queues. The plurality of worker process are for pulling jobs from the plurality of job queues and for the processing the jobs.

20 Claims, 11 Drawing Sheets

Event Journal Table 404A

| Domain | Subject | Sequence |
|--------|---------|----------|
| AAA | 111 | 1234 |
| BBB | DEF | 99999 |
| CCC | XY2 | 0 |
| BBB | EFG | 22 |
| BBB | EFG | 23 |
| AAA | 111 | 1235 |
| CCC | XY2 | 1 |
| ⋮ | ⋮ | ⋮ |

*Figure 4A*

| Event Journal Table 404B | |
|---|---|
| Namespace ID | Journal ID |
| ABCD | 34567 |
| XYZZ | 2345 |
| CDEF | 85623 |
| IJUH | 54 |
| ABCD | 34568 |
| CDEF | 85624 |
| PPPL | 23422 |
| ⋮ | ⋮ |

*Figure 4B*

Event Journal Table 404C

| Entity or Association Type | GUID | Revision ID |
|---|---|---|
| UserEntity | a7362a01-0e09-4ccc-b731-d81dd939121f | 1 |
| UserEntity | a7362a01-0e09-4ccc-b731-d81dd939121f | 2 |
| UserCollectionAssociation | 2890cf4e-2e88-4447-a99b-1650043aefbe | 1 |
| ApplicationEntity | 45560661-333c-4c29-bd7c-4edd0f536225 | 11 |
| CollectionEntity | 4c3daaf8-3fe4-4b08-94e9-927bd55114f4 | 6 |
| DeveloperEntity | a101c57d-8c3b-43fd-a90f-f7f97fb312e0 | 3 |
| DeveloperApplicationAssociation | 25287ea0-770b-4d0d-bd7b-8b5025bf0269 | 1 |

*Figure 4C*

LARGE-SCALE ASYNCHRONOUS EVENT PROCESSOR

CROSS-REFERENCE TO RELATED APPLICATIONS; BENEFIT CLAIM

This application claims the benefit of Provisional Appln. 62/549,914, filed Aug. 24, 2017, the entire contents of which are hereby incorporated by reference as if fully set forth herein, under 35 U.S.C. § 119(e).

TECHNICAL FIELD

The disclosed implementations of the present invention relate generally to event processing computing systems, and in particular, to a large-scale asynchronous event processing computing system.

BACKGROUND

Large-scale asynchronous event processing involves processing of event streams from various event sources. The implementation of large-scale event processing in a parallel and distributed processing environment typically includes the distribution of event streams among multiple disks and processors to make efficient use of aggregate storage and processing power.

Various distributed streaming platforms (e.g., Apache Kafka™) provide application programmers with tools such as application programming interfaces (APIs) to process event streams. These conventional platforms, however, fail to provide support for automatically dispatching event processing operations across multiple processors in a parallel and distributed processing environment in a manner that attempts to minimize event processing latency. Nor do these platforms automatically handle event processing faults.

BRIEF DESCRIPTION OF THE DRAWINGS

FIG. 4A depicts an example event journal table, according to some implementations.

FIG. 4B depicts another example event journal table, according to some implementations.

FIG. 4C depicts yet another example event journal table, according to some implementations.

DESCRIPTION OF IMPLEMENTATIONS

Figure 1:
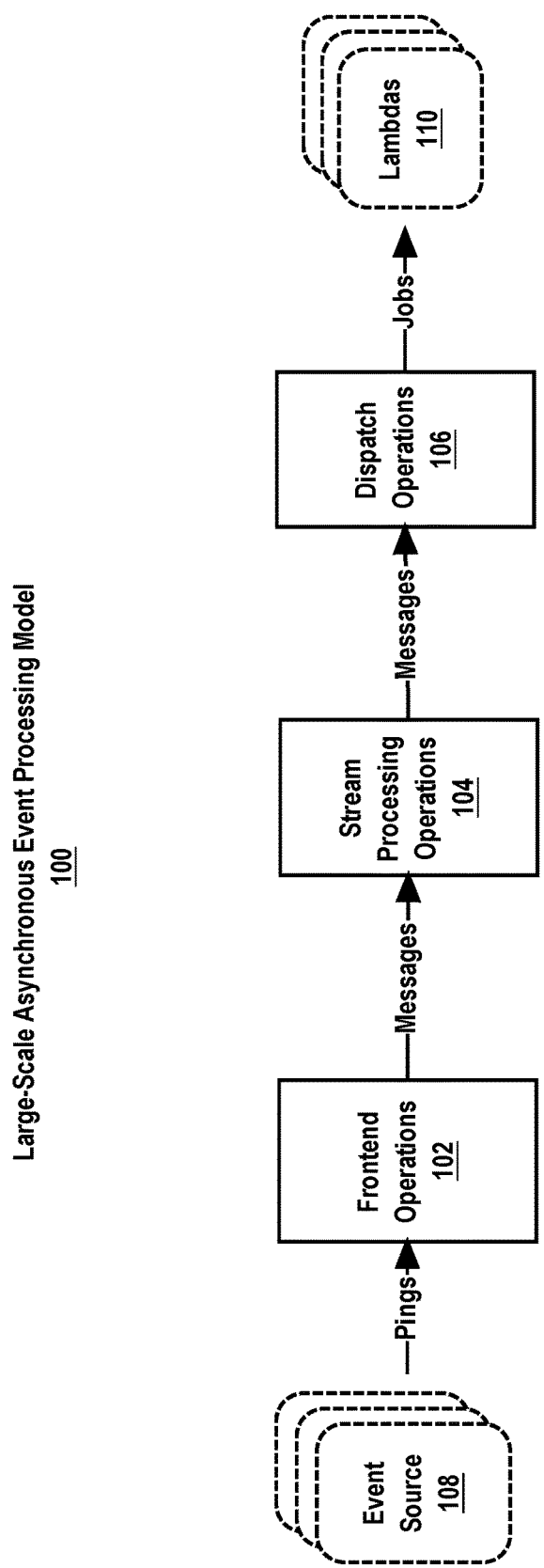
FIG. 1 is a block diagram of a large-scale asynchronous event processing model, according to some implementations.

A large-scale asynchronous event processor includes operations for automatically handling programming details associated with low-latency event processing and handling event processing faults. In the following description, for the purposes of explanation, numerous specific details are set forth in order to provide a thorough understanding of implementations. It will be apparent, however, that some implementations may be practiced without these specific details. In other instances, well-known structures and devices are shown in block diagram form in order to avoid unnecessarily obscuring an implementation.

General Overview

Although not limited as such, the large-scale asynchronous event processing system is useful as an event triggering and processing system to handle content item changes within a large-scale centrally hosted network filesystem. However, the system can also handle other event sources. For example, another type of event source that the system is useful for as an event triggering and processing system is a database system. In this context, the system is useful as an event triggering and processing system to handle database changes made by the database system.

As an example of using the large-scale asynchronous event processing system in the context of a large-scale centrally hosted network filesystem, if a content item in the centrally hosted network filesystem is changed, then it may be desirable to perform some asynchronous processing of the change. For example, if the changed content item is a text document and the change adds new terms (words) to the document, then it may be desirable to update a full-text search index so that the new version of the text document is discoverable using the index by the new terms. As another example, if a user of the centrally hosted network filesystem uploads a new photo content item, then it may be desirable to automatically generate a thumbnail image of the new photo so that the thumbnail can be presented to users in certain situations (e.g., as a preview before the full resolution photo is downloaded). The large-scale asynchronous event processing system is useful for facilitating low-latency, asynchronous processing of these types of events and other types of events at large-scale.

Another source of events in a centrally hosted network filesystem could be, for example, permission changes to a content item hosted with the centrally hosted network filesystem. For example, a new user may be added to a team or group of users, or an existing user may be removed from a team or group of users. In this case, the permissions of the added user, the removed user, or the team or group may need to be updated to reflect the added or removed user. As another example, a content item folder may be moved within a content item folder hierarchy from under one parent content item folder to a new parent content folder. In this case, the permissions for the moved content item folder may need to be updated to inherit the permission from the new parent content item folder. In a large-scale centrally hosted network filesystem, these types of events may occur continuously and in large volumes given the large number of users. Processing these events synchronously is not feasible because it would affect the responsiveness of end-user facing user interfaces. Thus, a large-scale asynchronous event processing solution is needed.

One of the goals of the large-scale asynchronous event processing system is to provide a level of guarantee to application-developers of "lambdas" (i.e., custom event processing logic) that the lambdas that the application-developers deploy to the system successfully process every event the lambdas are configured to process. This guarantee should be met even if a lambda fails (crashes) while processing an event. The system will continue to attempt to invoke the lambda to process the event until the lambda successfully processes the event. This is sometimes referred to herein as the "at least once guarantee." For the system to provide this guarantee introduces several challenges. First, ensuring reliability of the large-scale asynchronous event processing system would not be sufficient to meet this guarantee because, as mentioned, lambdas may fail (weak link). Second, the system should ensure that failure of one lambda should not affect the execution of another lambda (isolation). Third, the system should continue to attempt to have a lambda execute an event until the lambda successfully processes the event irrespective of the number of attempts. For example, a lambda may require a software bug fix in order to successfully process an event which takes the application-developer days or weeks to remedy. In some implementations, the large-scale asynchronous event processing system provides the least-one guarantee and also provides lambda isolation both between different lambdas and with respect to the same lambda but different events.

Another of the goals of the large-scale asynchronous event processing system is to provide a low latency event processor. For example, users would appreciate a centrally hosted network filesystem that makes a new version of a changed content item keyword searchable in a full-text index very soon after the content item is changed (e.g., within seconds or minutes as opposed to the next day).

Large-Scale Asynchronous Event Processing Model

FIG. 1 is a block diagram of a large-scale asynchronous event processing model 100 according to some implementations. The model 100 generally includes frontend operations 102, stream processing operations 104, and dispatch operations 106.

The frontend operations 102 receive pings from one or more event sources 108 and publish the pings as stream messages. A "ping" is a notification of one or more events from an event source. A "stream message" represents one or more events notified in a ping. Some non-limiting examples of events for which an event source may send a ping for processing by the frontend operations 102 include content item change events (e.g., creating a content item, updating a content item, deleting a content item, etc.) and end-user content item collaboration events (e.g., viewing a content item, editing a content item, commenting on a content item, changing access permissions on a content item, moving a content item within a content item folder/directory hierarchy, sharing a content item with another user, etc.). A content item is an item of digital content. The digital content typically has a content type which, in some cases, corresponds to a well-known file type (e.g., .pdf, .doc, .xls, .ppt, .jpg, .avi, .mpeg, .txt, etc.).

The stream processing operations 104 persist published stream messages until the dispatch operations 106 are ready to process the stream messages. In some implementations, the stream processing operations 104 are implemented by a distributed streaming computing platform such as, for example, the Apache Kafka™ distribution streaming platform, where the frontend operations 102 are the "producers" of the stream messages and the dispatch operations 106 are the "consumers" of the stream messages.

The dispatch operations 108 consume the persisted stream messages and dispatch event processing jobs to lambdas 110. A "lambda" is an application developer-defined event processing program. Some non-limiting examples of an event processing job that a lambda may perform include updating a content item index to index a new version of a changed content item, generating a thumbnail image preview of a new version of a changed content item, and delivering a notification of a changed content item to a third-party application.

Parallel and Distributed Computing System

To explain the operation of the large-scale asynchronous event processor, consider an example parallel and distributed computing system in which the large-scale asynchronous event processing is performed. Generally, implementations described herein can be performed by a set of processors interconnected by one or more data communication networks.

Figure 2:
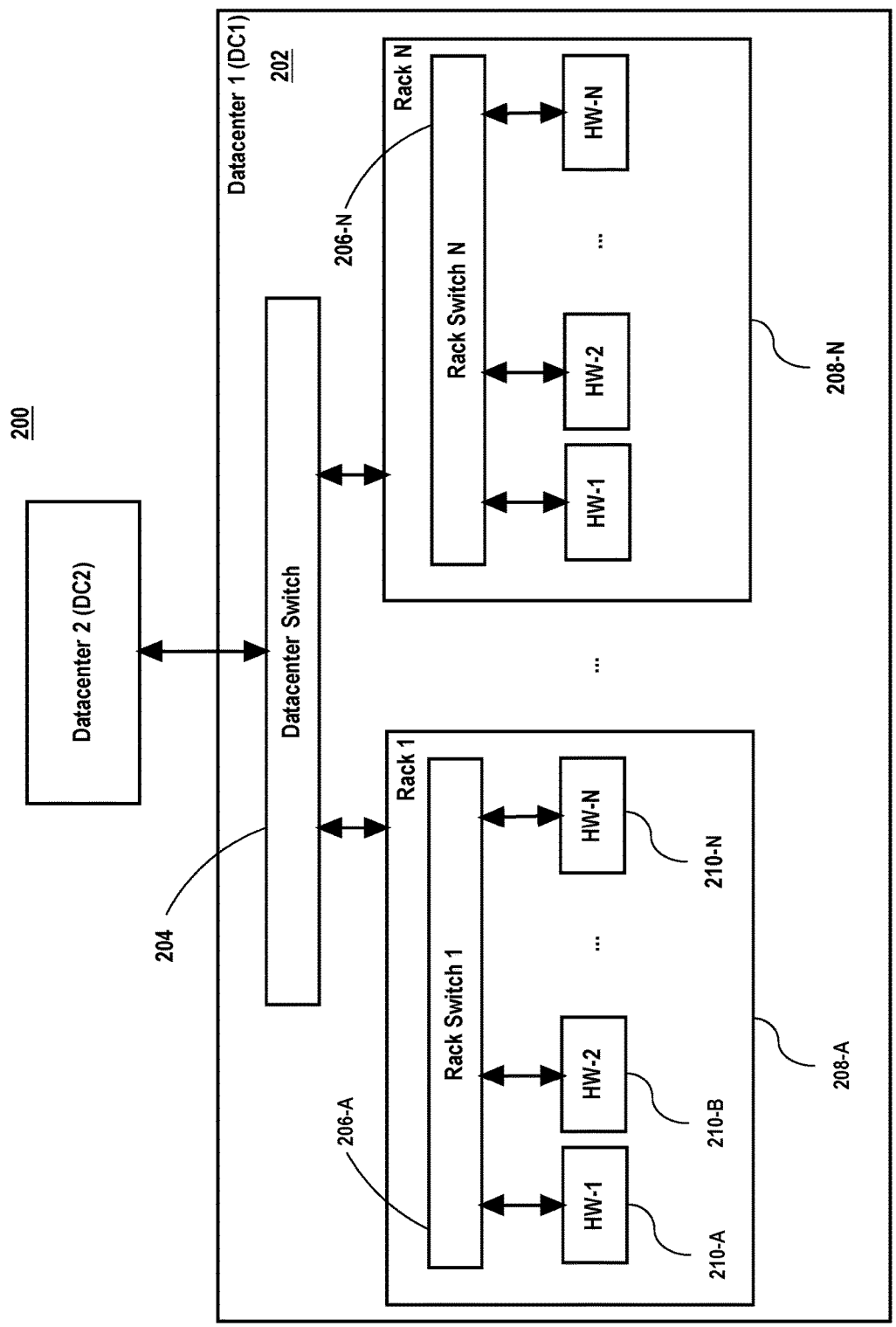
FIG. 2 is a block diagram of an example parallel and distributed computing system in which the large-scale asynchronous event processor is implemented, according to some implementations.

FIG. 2 is a block diagram of an example parallel and distributed computing system 200. System 200 processes and stores data and transmits data between datacenters DC1 and DC2. While only two datacenters are shown in the example system 200, a system suitable for performing large-scale asynchronous event processing may include any number of datacenters including just one datacenter or more than two datacenters.

System 200 may include computing, networking, and other equipment commonly found in a typical datacenter or other hosting facility including electronic power equipment, cooling equipment, servers, bridges, routers, switches, racks, and data storage systems. In some implementations, the network of the system 200 includes one or more wide area networks (WANs) as well as multiple local area network (LANs). In some implementations, the network utilizes a private network designed and operated exclusively for a particular company, customer, or operating entity. Alternatively, a public network may be used.

The datacenters DC1 and DC2 may be located geographically close to each other (e.g., in the same city or town), or located far away from each other (e.g., in different cities, states, or countries). In some implementations, each datacenter includes one or more racks, frames, or cabinets for housing computing and networking equipment. For example, datacenter 202 (DC1) include multiple racks 208A . . . 208N. Each rack can include one or more hardware machines that each provide one or more processors (CPUs) such as basic hardware machine 800 described below with respect to FIG. 8. For example, rack 208A includes hardware machines 210A . . . 210N. Each such hardware machine may be configured with a software system such as software system 900 described below with respect to FIG. 9 in addition to logic for performing operations of the large-scale asynchronous event processor.

In some implementations, the hardware machines within each rack are interconnected to one another through a rack switch 206. Further, all racks within a datacenter may be interconnected by a datacenter switch 204.

While the large-scale asynchronous event processor is implemented using a system like system 200 in some implementations, the large-scale asynchronous event processor is implemented using another arrangement of multiple interconnected hardware machines in other implementations. In another possible implementation, the large-scale asynchronous event processor is implemented using a single large-scale multiprocessor. In this implementation, frontend operations, stream processing operations, and dispatch operations are automatically assigned to processes running on the processors of the large-scale multiprocessor.

Large-Scale Asynchronous Event Processing System

Figure 3:
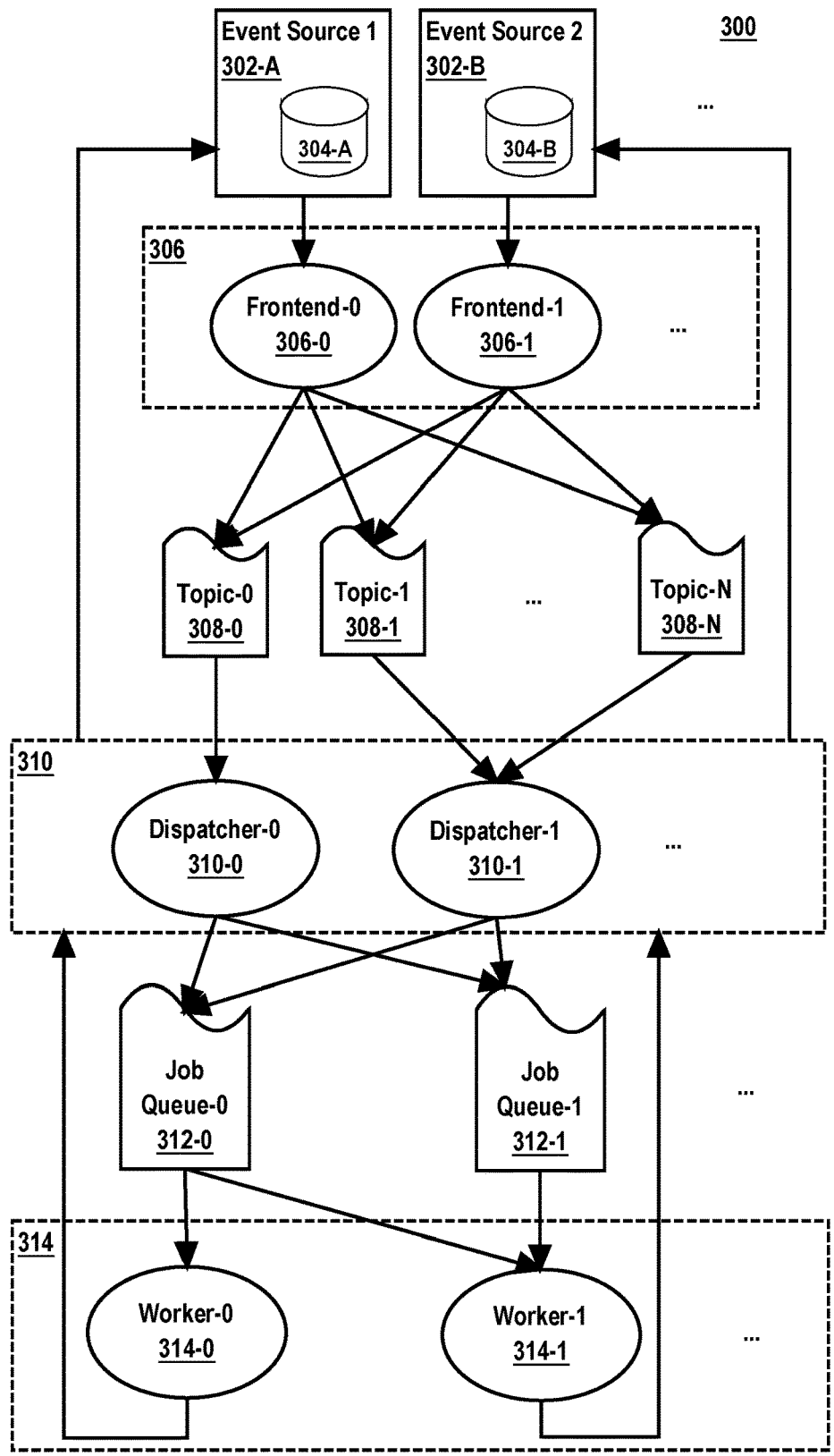
FIG. 3 is a block diagram of a large-scale asynchronous event processing system, according to some implementations.

FIG. 3 is a block diagram of a large-scale asynchronous event processing system 300. The system 300 provides programmers of event processing programs (lambdas) with a framework for writing event processing software with little or no concern about minimizing event processing latency measured as the time between when notification of an event is received from an event source and when an executing lambda begins processing the event. The system 300 is typically a distributed system having multiple hardware machines, possibly including network attached data storage systems that are interconnected by one or more communication networks.

FIG. 3 provides a logical view of a system 300. In some implementations, system 300 is implemented on a system having the physical structure of the system 200 of FIG. 2. In some implementations, the system 300 operates within a single datacenter of system 200 shown in FIG. 2. In other implementations, the system 300 operates within two or more datacenters of system 200.

As shown in FIG. 3, a set of one or more event sources 302 sends pings to a first set of processes 306, herein called frontend processes. The frontend processes 306 publish the received pings as stream messages to a set of topics 308 of a distributed streaming platform (e.g., Apache Kafka™ or the like). A second set of processes 310, herein called dispatcher processes, consumes the published stream messages from the topics 308 and en-queue jobs on a set of job queues 312. A third set of processes 314, herein called worker processes, pulls jobs from the job queues 312, executes lambdas to process the jobs, provides output produced by the lambdas to the dispatcher processes 310 and reports back to the dispatcher processes 310 on the result of job processing by the lambdas.

Generally, each "frontend process" is configured to receive remote procedure calls (pings) from the event sources that notify of events. Each frontend process is configured to publish each received event as a stream message to one of the topics 308. Each "dispatcher process" is configured to consume stream messages from one or more of the topics 308. The dispatcher processes 310 submit jobs for processing by the set of worker processes 314 by en-queuing jobs onto the job queues 312. As described in greater detail below, the dispatcher processes 310 track which events have already been processed by lambdas, schedule jobs for en-queuing onto the job queues 312 based on which events have not yet been processed, handle event processing faults, and so on.

Application developers are provided a configuration-based interface for selecting the types of events to be processed. The system 300 automatically handles routing events received from the event sources 302 to the worker processes configured to process the events. In some implementations, to configure a lambda to process a certain type of event, the only configuration information that an application programmer must provide is the "domain" and "subject" of the events to process. Generally, a "domain" of an event identifies a finite set of subjects on which events occurs. A "subject" of an event is unique within its domain and identifies the subject on which the event occurred. Note that the disclosed implementations are not limited to any particular type or number of event domains or subjects. Other event selection configuration criteria can be used, according to the requirements of the particular implementation of the system 300 at hand. In some implementations, the application programmer also provides a range of event sequence identifiers that a particular lambda is configured to process. In this case, the system 300 automatically ensures that only jobs for events within the range are dispatched to the lambda for processing. A "sequence" provides a strict ordering of events within the scope of a subject.

To perform large-scale asynchronous event processing, a set of one or more event sources 302 regularly send remote procedure calls (pings) to the frontend processes 306. For example, an event source may send a ping to a frontend process after one or more events have occurred. To track the occurrence of events, each event source may maintain a respective event journal. In system 300, event source 302-A maintains respective event journal 304-A, event source 302-B maintains respective event journal 304-B, and so on.

For example, event source 302-A may be a centrally hosted network filesystem and event journal 302-A may track changes (events) to content items hosted with the filesystem, and event source 302-B may be a content item metadata store for the centrally hosted network filesystem and event journal 302-B may track changes (events) to the metadata in the content item metadata store, such as content item collaboration events (e.g., sharing, viewing, downloading, editing, commenting on, changing access permissions on content items).

While some implementations of system 300 occur in the context of a centrally hosted network filesystem, system 300 may be implemented in the context of other types of large-scale computing systems, such as a large-scale online social networking system or a large-scale online search engine. For example, system 300 may be implemented to process events generated as a result of end-users interacting (or not interacting) with personalized news feeds of a multi-user online social networking platform. As another example, system 300 may be implemented to process events generated as a result of end-users interacting (or not interacting) with search engine search results generated for users in response to the submission of search queries to the search engine.

Event Journal

FIG. 4A shows an example event journal table 404A for keeping track of events that occur. In some implementations, each record in the journal corresponds to an event and records are appended to the table as events occur. The record for an event identifies the domain, subject, and sequence of the event. For example, in the portion of the event journal depicted in FIG. 4A, three events occurred in the "BBB" domain, one event for the "DEF" subject, and two events for the "EFG" subject. The sequences of the two events for the "EFG" subject in the "BBB" domain specify the order of the two events with respect to each other and other events in the same domain (i.e., "BBB") for the same subject (i.e., "EFG"). Thus, a sequence for an event is relative to a particular subject and a particular domain. Further, the event journal table 404A may contain columns other than those shown in FIG. 4A, such as columns for storing metadata and/or pointers or references thereto about the events that occur. Also, in a given implementation, the names of the columns may be different than those depicted in FIG. 4A.

An event source (e.g., 302-A) may ping a frontend process (e.g., 306-A) after one or more records are added to the event journal. A ping may notify of just one event or of multiple events. That is, a ping may batch multiple event notifications together in a single ping. Alternatively, a separate ping may be sent for each event.

An event journal may be dedicated to a particular domain, such as, for example, tracking changes to content items in a centrally hosted network filesystem. FIG. 4B shows an example of an event journal table 404B for keeping track of content item changes that occur in a centrally hosted network filesystem. In some implementations, each record in the table 404B corresponds to a change to a content item that belongs to a content item "namespace" of the centrally hosted network filesystem. A "namespace" uniquely (at least within table 404B) identifies a collection of one or more content items. For example, a set of content items that belong to a particular user account of the centrally hosted network filesystem may be one namespace, and another set of content items that are shared among multiple user accounts of the centrally hosted network filesystem may be another namespace, and/or a set of content items contained within a particular content item folder or directory of the centrally hosted network filesystem may be a namespace. The table 404B stores a journal identifier for ordering the content item changes within a namespace. In some implementations, the namespace identifier of a record in table 404B is used as the "subject" of an event and the associated journal identifier of the record in the table 404B is used as the "sequence" of the event. The "domain" of an event may be the same predefined value for all events in table 404B. For example, after one or more records are added to the table 404B, an event source may send a ping to a frontend process that notifies of each of the one or more events corresponding to the one or more records. For each event notification in the ping corresponding to a record in the table 404B, the ping may specify for the event corresponding to the record:
  a predefined domain identifier (which may be the same for all pings sent based on events recorded in table 404B) as the domain of the event,
  the namespace identifier of the record as the "subject" of the event, and
  the journal identifier of the record as the "sequence" of the event.

Further, the event journal table 404B may contain columns other than those shown in FIG. 4B, such as columns for storing information about the particulars of the content item changes. Also, in a given implementation, the names of the columns may be different than those depicted in FIG. 4B.

Other types of event journals are possible depending on the type of event source. For example, FIG. 4C shows an example of an event journal table 404C for keeping track of changes to content item metadata that occur in a centrally hosted network filesystem and/or a content collaboration system. Conceptually, the metadata may be organized in a graph comprising nodes and directed edges. Each node in the graph represents an "Entity" of the metadata and each directed edge in the graph from a "source" node to a "remote" node is an "Association" between the "Source Entity" represented by the source node and the "Remote Entity" represented by the remote node. The metadata can conceptually be stored on both Entities (nodes) and Associations (directed edges). Entities and Associations can be of different application developer-defined types.

In table 404C, each change to the metadata is represented as a record in the table 404C. The record for a change specifies the type of Entity or Association that is the domain of the change, a globally unique identifier (GUID) of the instance of the Entity or Association that is the subject to change, and a revision identifier that orders the change with respect to other changes to the same instance. In some implementations, the entity or association type identifier of a record in table 404C is used as the "domain" of an event, the GUID of the record is used as the "subject" of the event, and the revision identifier of the record is used as the "sequence" of the event. For example, after one or more records are added to the table 404C, an event source that maintains the table 404C may send a ping to a frontend process that notifies of each of the one or more events corresponding to the one or more records. For each event notification in the ping corresponding to a record in the table 404C, the ping may specify for the event corresponding to the record:
  an identifier of the Entity or Association type of the record as the domain of the event,
  the GUID of the record as the "subject" of the event, and
  the revision identifier of the record as the "sequence" of the event.

Further, the event journal table 404C may contain columns other than those shown in FIG. 4C, such as columns for storing information about the particulars of the content item metadata changes. Also, in a given implementation, the names of the columns may be different than those depicted in FIG. 4C.

Topic Sharding

As used herein, the term "topic" refers to a stream of messages to which new messages are published and from which published messages are consumed. A topic may be provided by a distributed streaming platform. Typically, the distributed streaming platform maintains at least one partitioned log for each topic, and often maintains more than one partitioned log for each topic to provide high-availability and fault tolerance. Each partition (sometimes referred to as a structured commit log) is an ordered, immutable sequence of messages to which new messages are appended. The messages in the partitions are typically each assigned a sequential identifier, called an offset, that uniquely identifies each message within the partition. The distributed streaming platform typically provides an application programming interface for publishing messages to selected topics and for consuming messages from selected topics. One non-limiting example of a distributed streaming platform used in some implementations is the Apache Kafka™ system. Documentation on Apache Kafka is available on the Internet at /documentation in the kafka.apache.org domain, the entire contents of which is hereby incorporated by reference.

In some embodiments, the set of topics 308 of the distributed streaming platform are sharded (partitioned) by a consistent mapping of the domain and subject of each event received in a ping. That is, for each event received in a ping, a stream message for the event is published by the frontend process receiving the ping to a selected topic of the topics 308. The topic is selected as a function of the domain and subject of the event. The stream message may contain information about the event included in the ping. For example, a stream message published for an event may contain the domain, subject, and sequence of the event.

In some implementations, the selection function is based on a consistent cryptographic hashing algorithm (e.g., MD5). The frontend process receiving a ping inputs the domain and subject of the event to the selection function. The selection function uses the consistent hashing algorithm to generate a cryptographic hash of the domain and subject and uses the cryptographic hash to consistently select one of the topics 308. For example, the topics 308 may be identified from 0 to N-1 where N is the number of topics (e.g., 256) and the selection function may select a topic as the cryptographic hash of the domain and subject modulo N. By using the selection function, each of the frontend processes 306 may consistently select topics for any event, without having to coordinate with each other.

It should be noted that because the selection function that selects the topic for an event is made consistently based on the domain and subject of the event, events within the same domain and for the same subject are published to the same topic, assuming the set of available topics 308 is the same for all the events. Further, the system 300 can be scaled horizontally by adding more topics/machines to the set of topics. This can reduce event processing latency if publishing events to the existing set of topics is a bottleneck because the existing number of topics is overloaded with publishing requests from the frontend processes 306. Further, average latency of stream messages between when the stream messages are published to a topic of the set of topics and when the stream messages are consumed from the topic is reduced by adding more topics/machines to the set of topics because the average length of each topic in terms of the average number of stream messages in the topic during a period of time is shortened because there are more topics available to which the frontend processes 306 can publish stream messages.

Dispatcher

To perform large-scale asynchronous event processing, a set of dispatcher processes 310 consume stream messages from the set of topics 308. Each dispatcher process is assigned to consume stream messages from one or more topics of the set of topics 308. In some implementations, only one of the dispatcher processes 310 consumes stream messages from each topic. Note that in this case, because of the consistent topic sharding scheme discussed above, while a dispatcher process is assigned to a topic, the dispatcher process will consume all stream messages for a given domain and subject that are published by the frontend processes 306 to the set of topics 308.

The set of dispatcher processes 310 may coordinate with each other to elect which dispatcher processes will consume stream messages from which of the topics 308. Each of the topics 308 may have one dispatcher process that is elected to consume stream messages from the topic. However, a dispatcher process may consume stream messages from multiple topics. Thus, there may be fewer dispatcher processes 310 than there are topics 308. Alternatively, there may be the same number of dispatcher processes 310 as there are topics 308, one dispatcher process for each topic. In some embodiments, the election of assignment of dispatcher processes to topics is coordinated using a distributed coordination service, such as Apache Zookeeper™.

To perform large-scale asynchronous event processing, the set of dispatcher processes 310 en-queues jobs for the worker processes 314 onto the job queues 312. A job may be defined as a set of one or more events to be processed by a particular lambda. A dispatcher process may en-queue the job onto one or more of the job queues 312 from which the particular lambda is configured to receive the job. The particular lambda may be associated with one or more of the worker processes 314. That is, each of the one or more worker processes that the particular lambda is associated with has access to the lambda and is configured to execute the lambda. In some implementations, each lambda executes on a separate machine (physical or virtual) from the other lambdas to provide fault and resource consumption isolation.

A single lambda can execute as multiple worker processes (possibly on the same machine) to provide parallel event processing. For example, a dispatcher process can partition a partitionable task for a lambda into three jobs and submit the three jobs to a job queue configured to provide jobs for the lambda, and three worker processes for the lambda (possibly on the same machine) may each pull one of the three jobs from the job queue and execute the jobs concurrently (e.g., at least partially at the same time).

Having multiple worker processes execute a single lambda increases job processing availability of jobs for the lambda. For example, jobs for the lambda may continue to be processed even if one of the other multiple worker processes for the lambda unexpectedly crashes or fails.

Having multiple worker processes execute a single lambda can decrease event processing latency. For example, any of the multiple worker processes can pull a job for the lambda from a job queue when the worker process is ready to process the job. If one of the worker processes is idle while the other worker processes are busy processing other jobs, then the idle worker processes can immediately pull the job from the job queue and begin processing the job. Otherwise, if there are no idle worker processes for the lambda, then the job would remain in the job queue until one of the currently busy worker processes is no longer busy processing another job.

A dispatcher process may en-queue a job for a particular lambda onto one or more job queues that the particular lambda is configured to receive the job from. Using multiple job queues for the job provides fault tolerance should one of the job queues unexpectedly fail or crash.

Even if the case where a job queue does not unexpectedly fail or crash, using multiple job queues can decrease event processing latency. For example, a dispatcher process may en-queue a job onto two or more job queues for providing jobs to a particular lambda. A worker process for the lambda can pull the job from the job queue at which the job is available (at the head of the job queue) first, if jobs are moving more slowly through the other job queues.

Referring now to FIGS. 2 and 3, in some implementations, the job queues 312 and the worker processes 314 are distributed over one or more datacenters DC1 and DC2. Ideally, the dispatcher processes 310 en-queue jobs on the jobs queues in datacenters where the machines 210 that execute the worker processes that will process the jobs are located so as to minimize network traffic whenever possible. In some implementations, the dispatcher processes 310 uses application-developer provided configuration information for a lambda to determine the appropriate job queue for en-queuing a job for the lambda. When a dispatcher process consumes a stream message from a topic, it determines one or more lambdas that are configured to process the event represented by the stream message. The application-developer provided configuration information may specify a datacenter location for a lambda. In that case, the dispatcher process may search for job queue in that datacenter that is configured to provide jobs for the lambda and en-queue the job onto that job queue, as opposed to a job queue in another datacenter that is configured to provide jobs for the lambda.

This en-queuing may occur regardless of the datacenter in which the dispatcher process executes.

By en-queuing jobs for lambdas onto jobs queues in datacenters where the lambdas execute, lambdas can pull jobs from the job queues 312 without requiring a large amount of inter-datacenter network traffic. This in turn allows events to be processed with lower latency without straining the limits of the network of the system 200.

Topologies

Referring again to FIG. 3, when a dispatcher process consumes a stream message from a topic, it determines one or more lambdas that are configured to process the event represented by the stream message. More precisely, in some implementations, the dispatcher process determines one or more topologies that are configured to process the event. A "topology" is an application-developer defined directed acyclic graph (DAG) of one or more lambdas. The DAG represents execution dependencies between the lambdas of the DAG. The dispatcher processes 310 ensure that the lambdas of a topology are executed in proper dependency order according to the DAG. For purposes of this disclosure, a topology of only one lambda may still be viewed as a DAG having only one graph node representing the lambda. The lambda of such a topology does not have any execution dependencies in the topology.

A job, then, may be viewed as a set of one or more events to be processed by a particular topology. A dispatcher process, when it receives a stream message from a topic, may determine one or more topologies that are configured to process the event represented by the stream message. The dispatcher process may then generate a job for processing the event, select one or more job queues on which to en-queue the generated job, and en-queue the job onto the selected job queues. A topology may have exactly one "parent" lambda. Initially, the dispatcher process may en-queue the job for the parent lambda of the topology. Then, when execution of the parent lambda completes, the dispatcher process may en-queue further jobs for one or more child lambdas of the parent lambda as specified in the DAG for the topology, and so on until all of the lambdas of the topology have been executed.

In some implementations, each dispatcher process is configured to consume events for a particular event domain and the dispatcher process consumes events in that particular domain from multiple topics.

In some implementations, each topic of the set of topics 308 is claimed by at most one dispatcher process of the set of dispatcher processes 310.

In some implementations, when a dispatcher process consumes a stream message from a topic, it does not rely on the sequence in the stream message. Instead, the dispatcher process uses the domain and subject of the stream message to query the event source from which the event originated to determine the current latest sequence for the domain and subject. This sequence is then used as the target sequence by the dispatcher process when determining which events from the event source to include as part of a job. Another way to implement this is to use the domain and subject of the stream message to lookup the topologies and event cursors for the domain and subject in the cursor table. Then query the event source for all events having a sequence equal to or greater than the smallest of the event cursors. This obtains all events to be submitted to the topologies up to the most recent events in the event source at the time of the query which may be more recent than the sequence of the stream message if an event in the domain and for the subject subsequently occurred at the event source.

In some implementations, the number of worker processes 314 outnumbers the number of job queues 312 and each worker process tries to pull jobs from each of the job queues 312 until a job is successfully pulled (e.g., a job for the lambda that the worker process executes is at the head of one of the job queues 312). This is repeated continuously to provide continuous event processing of events.

In some implementations, a worker process that successfully pulls a job from one of the job queues will try and pull a next job from the same job queue after completing the previous job. The worker process may pause (sleep) in between pulling jobs for a jitter interval (a length of time randomly selected within a range) to reduce the possibility of many worker processes attempting to pull jobs from the same job queue at the same time. A back off strategy may also be used where the worker process attempts to pull successive jobs from the same job queue pausing for an increasing jitter interval after each successful pull until the increasing jitter interval reaches a threshold period of time after which the worker process may attempt to pull jobs from other job queues until it successfully pulls a job from one of the job queues at which point it may again attempt to successively pull jobs from that job queue using the back off strategy. To summarize, the worker process will successively pull jobs from the same job queue so long as there are jobs to be pulled from that job queue and the worker process does have to wait too long for a new job to be available in that queue. If the worker process has to wait too long, then the worker process "gives up" on that job queue and "hunts" for another job queue with a job ready for it.

In some implementations, the jobs queues 312 are implemented as message queues using the Redis system. More information on Redis available on the Internet at/documentation in the redis.io domain, the entire contents of which is hereby incorporated by reference as if fully set forth herein.

In some implementations, execution of a topology by a dispatcher process involves executing a first lambda of the topology in one datacenter and a second lambda dependent on the first lambda according to the DAG of the topology in another datacenter. In this case, the dispatcher process can be one of the two datacenters or another datacenter. Thus, a dispatcher process can execute a topology where lambdas of the topology execute in different datacenters by en-queueing jobs for the lambdas on the appropriate job queues.

In some implementations, the job queues within a datacenter are sharded by lambda identifiers and the dispatcher process in the datacenter selects a job queue on which to en-queue a job for a "target" lambda in the datacenter based on an identifier of the target lambda. A consistent hashing scheme may be used. For example, the dispatcher process may generate a consistent cryptographic hash (MD5) based on the target lambda identifier and use the hash to select a job queue in the datacenter and the worker process for the lambda may use the same hashing scheme to select the same job queue. In this way, the dispatcher process can provide jobs for the lambda without the dispatcher process and the worker process having to negotiate a job queue selection. By using the consistent hashing scheme, the dispatcher process and the worker process select the same job queue independently without having to communicate with each other.

In some embodiments, the application-developer of a lambda can specify, in configuration of the lambda, the number of job queues from which worker processes that execute the lambda will attempt to pull from. For example, the number of job queues may be 4 or 8. Thus, a given worker process that executes a lambda may attempt to pull jobs from multiple queues.

Dispatching and Event Cursor Tracking

Figure 5:
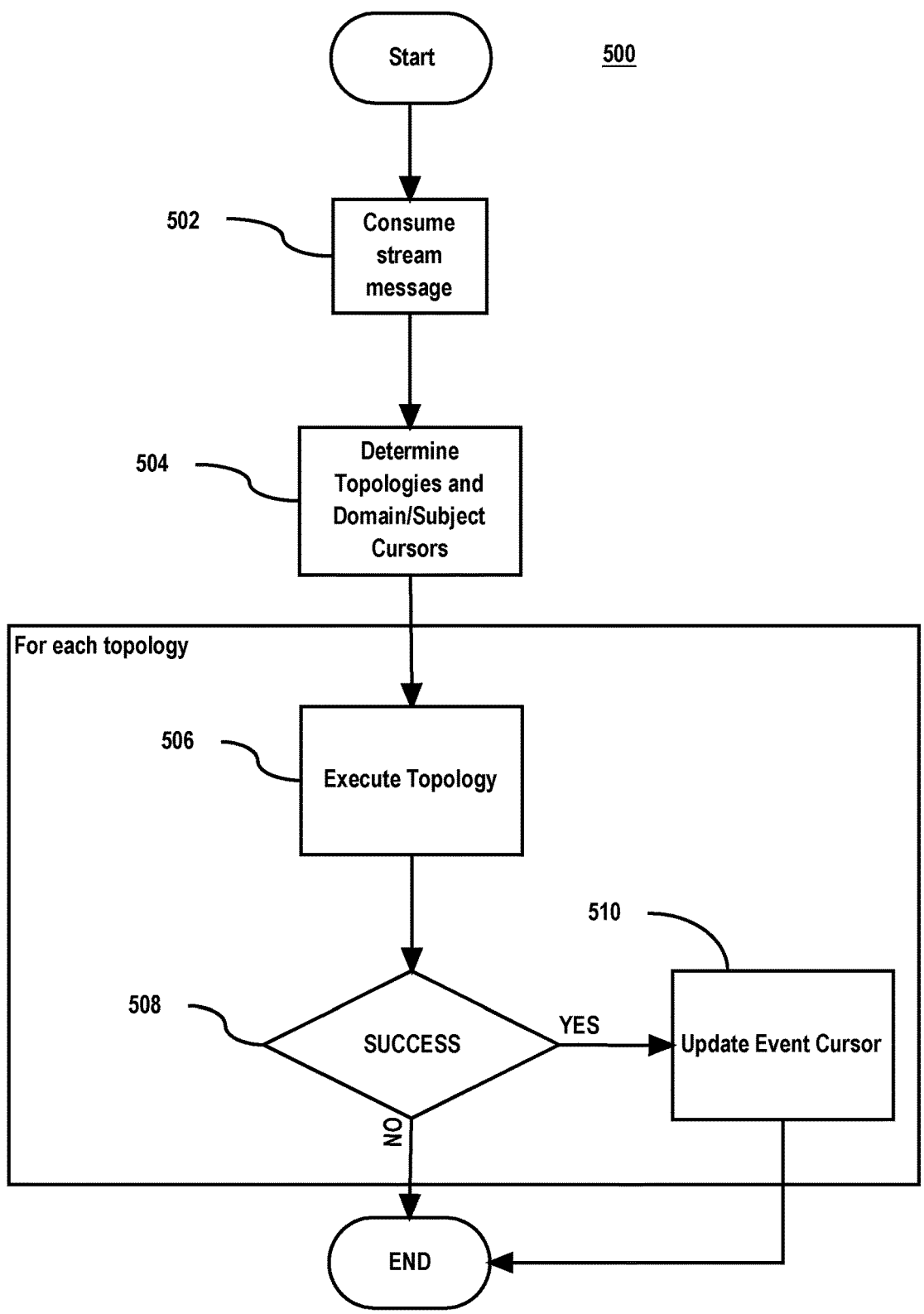
FIG. 5 is a flowchart of a process for dispatching jobs to worker processes, according to some implementations.

FIG. 5 is a flow diagram of some implementations of a process 500 for dispatching jobs to worker processes. While process 500 described below includes a number of steps that appear to occur in a specific order, it should be apparent that the process 500 steps are not limited to any particular order, and, moreover, the process 500 can include more or fewer steps, which can be executed serially or in parallel (e.g., using parallel processors or a multi-threading environment). Further, it should be noted that the steps or acts in process 500 are independent of any particular event processing performed by a lambda and are implemented using modules or instructions that are independent of any particular event processing performed by a lambda. Only the actual events provided to a lambda for processing and output received from lambda execution are lambda-specific. By making a clear boundary between the lambda-independent and the lambda-specific aspects of performing large scale asynchronous event processing, the lambda-independent aspects can be optimized for low latency, thereby making the entire large-scale asynchronous data processing very efficient.

The process 500 begins by a dispatcher process consuming (Step 502) a stream message from a topic. As mentioned, the dispatcher process may subscribe to the topic through an election process coordinated amongst the dispatcher processes 310. The stream message represents an event and contains the domain, the subject, and the sequence of the event. Next, the dispatcher process uses the domain and the subject of the event to determine (lookup) (Step 504) the topologies that are configured to process events of that type (e.g., events for the subject in the domain). For this, the dispatcher processes 310 may maintain an in-memory topology cursor table (which is implemented as a key-value store in some implementations). The cursor table maps a given domain/subject (key) to a list (value) of identifiers of topologies that are configured to process events for that subject in that domain. In some implementations, the cursor table is populated based on application-developer defined configuration for the topologies. Each topology identified in the list value may be paired in the list with an event cursor maintained by the dispatcher processes 310. An "event cursor" identifies the highest sequence for the subject in the domain that was successfully processed by the associated topology. When the topology successfully processes an event for the subject in the domain with a higher sequence, then the dispatcher process, upon being notified of the successful processing, updates the event cursor for the topology to be equal to the higher sequence of the event just successfully processed. By doing so, events that topologies successfully process are tracked by the dispatcher processes 310.

Steps 506, 508, and 510 may be performed for each determined topology for the event domain and subject identified in the cursor table at Step 504. At step 506, the topology is executed. A process 600 for executing a topology is described below with respect to FIG. 6. If the topology is executed successfully, then, at Step 508, the event cursor for the topology and the event domain and subject in the cursor table is updated (Step 510) to be equal to the highest event sequence successfully processed by the successful execution of the topology. Otherwise, if execution of the topology is not successful, the event cursor for the topology is not updated.

Figure 6:
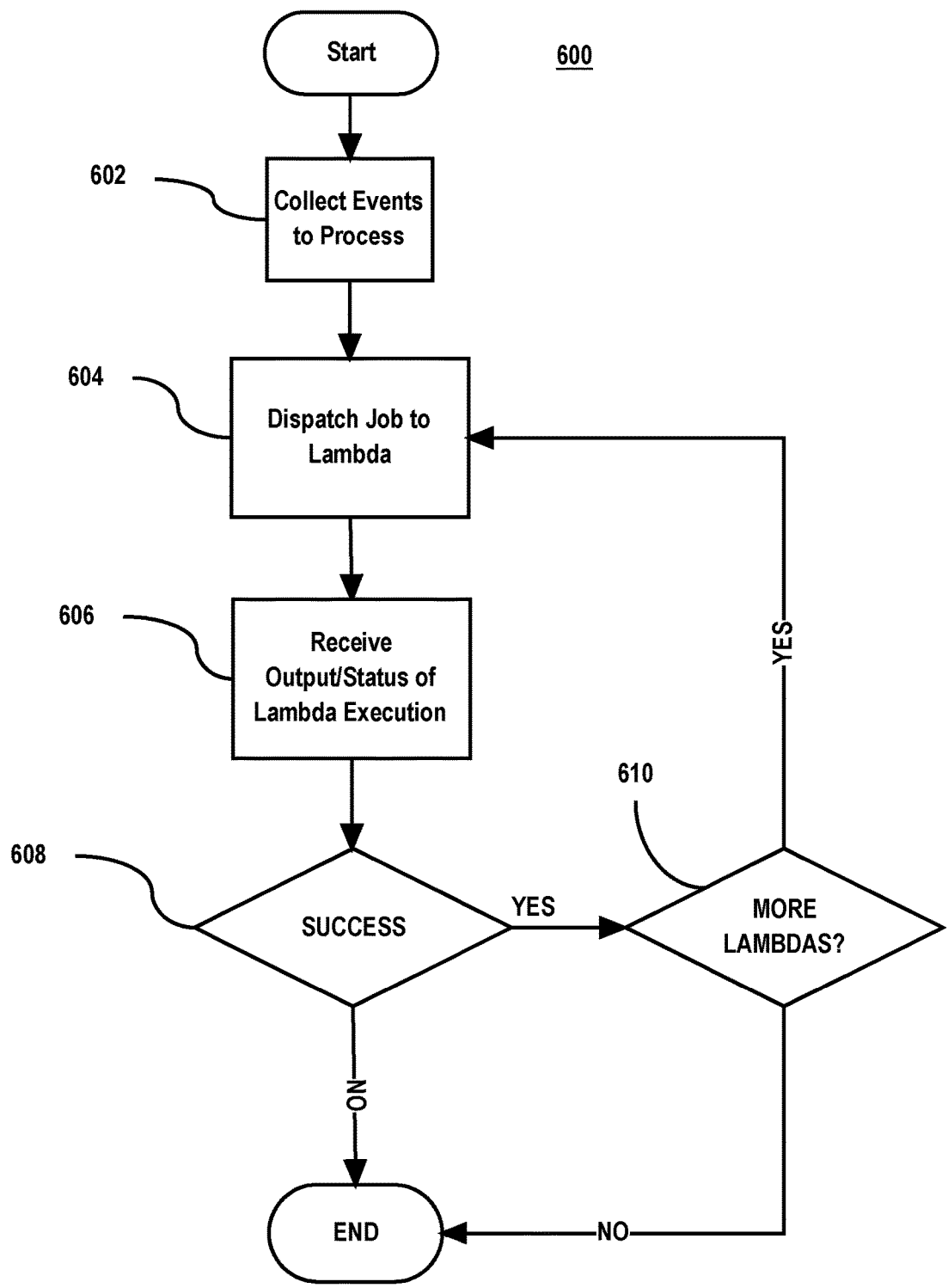
FIG. 6 is a flowchart of a process for executing a topology, according to some implementations.

FIG. 6 is a flow diagram of some implementations of a process 600 for executing a topology as in Step 504 of process 500. The process starts given a "target" topology, a "current" event cursor for the target topology from the cursor table, and a "target" domain, "target" subject, and "target" sequence of a "target" event to be processed.

If previous events for the target domain and target subject after the current event cursor but before the target sequence were not successfully processed (e.g., because of a lambda failure processing the previous events), then the current event cursor can be more than one sequence behind the target sequence. This can also happen if a ping was never received from an event source for the previous event (e.g., because of a network partition between the event source and the frontend processes 306 or between the frontend processes 306 and the distributed streaming platform that manages the topics 308). In this case, the dispatcher process will attempt to catch up the current event cursor for the target topology to the target sequence of the target event to be processed. It does this by collecting (Step 602) from the event source that generated the event, all events for the target domain and the target subject greater than the current event cursor up to the target sequence. This collecting may also involve obtaining metadata about the events from the event source that is used by the lambda to process the event.

At step 604, the dispatcher process dispatches a job for the parent lambda of the topology. To do this, the dispatcher process determines which of the job queues 312 are configured to provide jobs for the parent lambda. This determination may be based on an identifier of the lambda and a function for mapping the lambda identifier to the target job queues for the lambda. The dispatcher process then en-queues the job onto each of the target job queues. The en-queued job can contain specifics about the event to be processed such as the events and metadata collected at Step 602. The job may also provide a handle (e.g., an interprocess communication handle) by which the parent lambda can provide output for execution and return execution status to the dispatcher process that en-queued the job.

At step 606, the dispatcher process receives output of the parent lambda's execution of the job and status of the execution via the handle provided the worker process that executes the parent lambda.

At step 608, the dispatcher process determines whether the parent lambda execution was successful based on the status received at step 606. If successful and there are more lambdas to execute according to the DAG of the topology, then, at step 610, job(s) for the child lambda(s) are dispatched. These jobs may include the output received at Step s06 from the parent lambda in addition to any input to the parent lambda from the job for the parent lambda. This allows the execution of the child lambda(s) to process the event(s) using information output by the parent lambda. Steps 604, 606, 608, and 610 may be repeated until lambdas of the DAG have been executed for the event and so long as the lambda execution completed successfully.

Execution of the topology ends if all lambdas of the DAG process the event successfully or one of the lambdas fails.

Note that the dispatcher process 606 may not receive output and/or status from the parent lambda's execution if the lambda's execution failed (crashed) before output and/or status could be provided. In this case, the dispatcher process may treat this situation as if the lambda returned a failure status. For example, the dispatcher process may consider the lambda has having failed if not output or status is received after a threshold amount of time.

It should be noted that processes 500 and 600 allow job queues 312 and worker processes 314 to be scaled horizontally with additional machines to reduce overall event processing latency of the system.

Event Refresher

Figure 7:
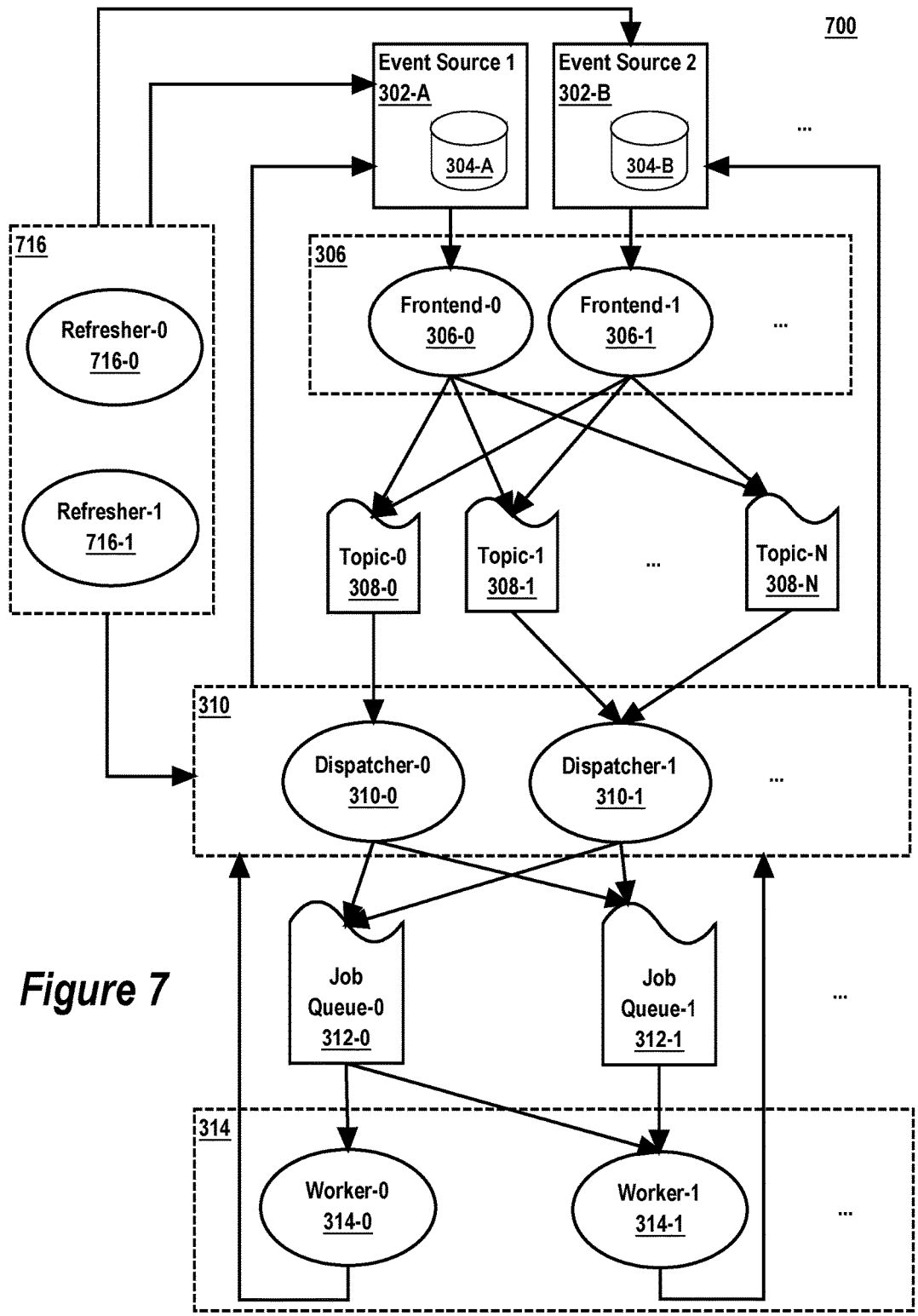
FIG. 7 is a block diagram of a large-scale asynchronous event processing system with an event refresher, according to some implementations.

FIG. 7 is block diagram of a large-scale asynchronous event processing system with an event refresher feature. Events may not be processed because of a lambda failure processing the event or because a ping was never received from an event source for the event (e.g., because of a network partition between the event source and the frontend processes 306 or between the frontend processes 306 and the distributed streaming platform that manages the topics 308). To handle this and provide an at least once guarantee for all events, the system 700 of FIG. 7 includes the system 300 of FIG. 3 augmented with a set of one or more processes 716, called refresher processes. Each refresher process periodically scans the event journal 304 of an event source 302 for unprocessed events. The refresher process submits any unprocessed events to the dispatcher process 316 for dispatching as in process 500 and process 600 described above. To determine what events have been unprocessed, the refresher process may use information in the topology cursor table. In particular, the event cursor for a topology in the topology cursor table for a given domain and subject can be compared with the latest sequence for the domain and subject in the event journal. The refresher may collect and submit events that are greater than the event cursor up to latest sequence.

According to some implementations, the system includes a "refresher" process or set of processes that allows the system to operate under looser availability requirements. In particular, the refresher supports the at least one guarantee by identifying events with the event sources and resubmitting the identified events to the system for which pings from event sources may not have been received by the system or for which lambda execution failed. Thus, if the system is temporarily unavailable to receive a ping from an event source because of a failure (e.g., network partition), the refresher ensures that events for which pings were not received are successfully processed by the system. It should be noted that the refresher also allows the system to drop events for example if computing resources are currently overloaded. For example, if a particular lambda is behind in processing events, then new events for the lambda can be dropped by dispatcher process of the system. The refresher will resubmit the dropped events to the system at a later time for processing.

In some implementations, because of the at least one guarantee, a lambda event processing implementation may be required to be idempotent with respect to an event because the lambda may be invoked multiple times by a dispatcher process of the system (by en-queuing a job on a job queue) for the same event until the lambda successfully processes the event.

In some implementations, the class of events that can be processed by the system include any set of events that are sequenced within a subject. For example, the subject can be a content item namespace and the set of sequenced events can be a set of ordered content item changes to content items in the content item namespace.

In some implementations, when the refresher resubmits an event to the system, it does so directly to a dispatcher process of the system through an in-memory database such as the Redis database that operates analogously to the distributed streaming platform that implements the topics. That is, instead of publishing stream messages to sharded Apacha Kafka topics, the refresher processes 716 may subset missed event information to sharded Redis channels. The sharding of the Redis channels may be analogous to the sharding of the topics discussed above so that a given dispatch process obtains all events for a given domain and subject within the domain.

In some implementations, the sequence of a set of events for all subjects in a domain maintained in an event journal by an event source are sequenced timestamps. In this case, the refresher processes 716 may time bound the scope of the scan of the set of events by time based on a known time bound. For example, the refresher processes 716 may be configured with a time bound such as past 7 days. In this case, when scanning an event journal for missed events for a domain where the events a sequenced by time, the refresher process can limit the scan to events with sequences within the time bound (e.g., the past seven days). This is useful if there are a large number of subjects within the domain (e.g., billions) because it limits the scope of the scan and thereby reduces the computing resources consumed scanning the event journal for missed events.

Figure 8:
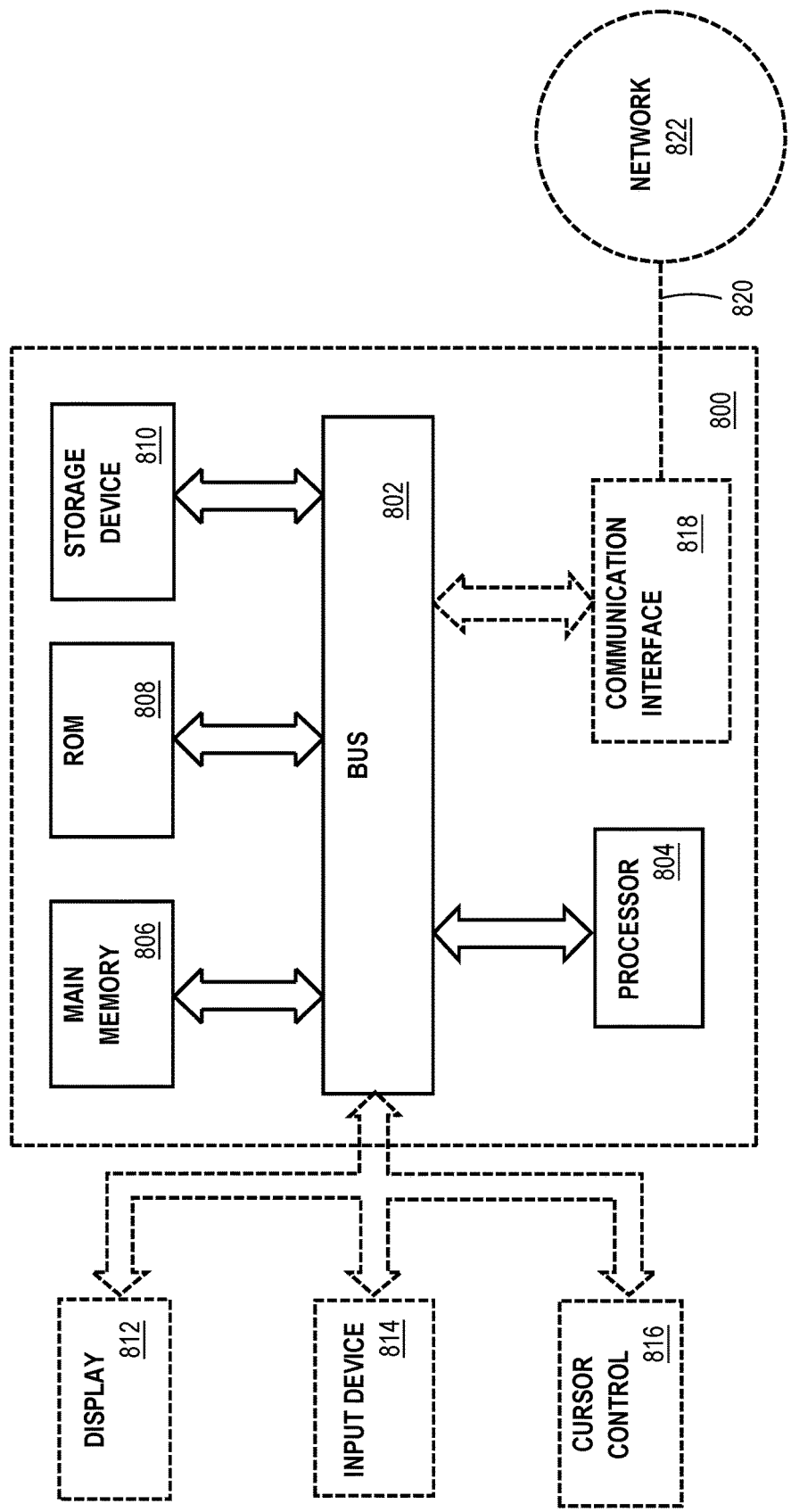
FIG. 8 illustrates an example of a basic hardware machine used in some implementations of a large-scale asynchronous event processor.

Basic Implementing Mechanisms for a Large-Scale Asynchronous Event Processor Some implementations of a large-scale asynchronous event processor are based on a computing system comprising one or more processors and memory. The one or more processors and memory may be provided by one or more hardware machines. FIG. 8 illustrates an example of a basic hardware machine 800 used in some implementations of a large-scale asynchronous event processor. Hardware machine 800 and its hardware components, including their connections, relationships, and functions, is meant to be exemplary only, and not meant to limit possible implementations of a large-scale asynchronous event processor. Other hardware machines suitable for an implementation of a large-scale asynchronous event processor may have different components, including components with different connections, relationships, and functions.

Hardware machine 800 includes a bus 802 or other communication mechanism for addressing a main memory 806 and for transferring data between and among the various components of hardware machine 800.

Hardware machine 800 also includes a processor 804 coupled with bus 802 for processing information. Processor 804 may be a general-purpose microprocessor, a system on a chip (SoC), or another hardware processor.

Main memory 806, such as a random-access memory (RAM) or other dynamic storage device, is coupled to bus 802 for storing information and software instructions to be executed by processor 804. Main memory 806 also may be used for storing temporary variables or other intermediate information during execution of software instructions to be executed by processor 804.

Software instructions, when stored in storage media accessible to processor 804, render hardware machine 800 into a special-purpose computing machine that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a machine to perform specific operations, and including, but not limited to, application software, desktop applications, scripts, binaries, operating systems, device drivers, boot loaders, shells, utilities, system software, JAVASCRIPT, web pages, web applications, mobile applications, plugins, embedded software, microcode, compilers, debuggers, interpreters, virtual machines, linkers, and text editors.

Hardware machine 800 includes a read-only memory (ROM) 808 or other static storage device coupled to bus 802 for storing static information and software instructions for a processor 804.

A mass storage device 810 is coupled to bus 802 for persistently storing information and software instructions on fixed or removable media, such as magnetic, optical, solid-state, magnetic-optical, flash memory, or any other available mass storage technology. The mass storage may be shared on a network, or it may be dedicated mass storage. Mass storage device 810 may store a body of program and data for directing operation of hardware machine 800, including an operating system, user application programs, driver, and other support files, as well as other data files of all sorts.

Hardware machine 800 may be coupled via bus 802 to a display 812, such as a liquid crystal display (LCD) or other electronic visual display, for displaying information to a computer user. A touch sensitive surface incorporating touch detection technology (e.g., resistive, capacitive, etc.) may be incorporated with display 812 to form a touch sensitive display for communicating touch gesture (e.g., finger or stylus) input to processor 804.

An input device 814 may be coupled to bus 802 for communicating information and command selections to processor 804. Input device 814 may include alphanumeric and other keys. Input device 814 may include one or more physical buttons or switches such as, for example, a power (on/off) button, a "home" button, volume control buttons, or the like.

A cursor control 816, such as a mouse, a trackball, touchpad, touch-sensitive surface, or cursor direction keys for communicating direction information and command selections to processor 804 and for controlling cursor movement on display 812, may be coupled to bus 802. Cursor control 816 may have two degrees of freedom in two axes, a first axis (e.g., x) and a second axis (e.g., y), that allows the device to specify positions in a plane. Cursor control 816 may have more degrees of freedom with a third axis (e.g., z). For example, cursor control 816 may have three translational degrees of freedom (e.g., surge, heave, and sway) in three perpendicular axes, that allows the device to specify position in the three axes. Cursor control 816 may have three rotational degrees of freedom (e.g., pitch, yaw, roll) about three perpendicular axes, that allows the device to specify an orientation about the three axes.

While one or more of display 812, input device 814, and cursor control 816 may be external components (i.e., peripheral devices) of hardware machine 800, some or all of display 812, input device 814, and cursor control 816 may be integrated as part of the form factor of hardware machine 800.

A function or operation of some implementations of a large-scale asynchronous event processor is performed by hardware machine 800 in response to processor 804 executing one or more programs of software instructions contained in main memory 806. Such software instructions may be read into main memory 806 from another storage medium, such as a storage device 810. Execution of the software instructions contained in main memory 806 cause processor 804 to perform the function or operation. While a function or operation may be implemented entirely with software instructions, hard-wired or programmable circuitry of hardware machine 800 (e.g., an ASIC, a FPGA, or the like) may be used in place of or in combination with software instructions to perform the function or operation.

The term "storage media" as used herein refers to any non-transitory media that store data and/or software instructions that cause a hardware machine to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more software instructions to processor 804 for execution. For example, the software instructions may initially be carried on a magnetic disk or solid-state drive of a remote computer. The remote computer can load the software instructions into its dynamic memory and send the software instructions over a data communications network. Hardware machine 800 can receive the data over the data communications network and appropriate circuitry can place the data on bus 802. Bus 802 carries the data to main memory 806, from which processor 804 retrieves and executes the software instructions. The software instructions received by main memory 806 may optionally be stored on storage device 810 either before or after execution by processor 804.

Hardware machine 800 may include a communication interface 818 coupled to bus 802. Communication interface 818 provides a two-way data communication coupling to a wired or wireless network link 820 that connects hardware machine 800 to a data communications network 822 (e.g., a local area network (LAN), a wide area network (WAN), a wireless local area network (WLAN), a metropolitan area network (MAN), a storage area network (SAN), etc.). Network link 820 provides data communication through network 822 to one or more other networked devices.

Communication interface 818 may send and receive electrical, electromagnetic, or optical signals that carry digital data streams representing various types of information. For example, communication interface 818 may be implemented by a wired network interface card, a wireless network interface card with an integrated radio antenna, or a modem.

Network link 820 may provide a connection through network 822 to a host computer or to data equipment operated by an Internet Service Provider (ISP). The ISP may in turn provide data communication services through the world-wide packet data communication network now commonly referred to as the "Internet". Network 822 and Internet use electrical, electromagnetic or optical signals that carry digital data streams. The signals through the various networks and the signals on network link 820 and through communication interface 818, which carry the digital data to and from hardware machine 800, are example forms of transmission media.

Hardware machine 800 can send messages and receive data, including program code, through network 822, network link 820, and communication interface 818. In the Internet example, a server might transmit a requested code for an application program through Internet, ISP, and network 822 and communication interface 818.

The received code may be executed by processor 804 as it is received, and/or stored in storage device 810, or other non-volatile storage for later execution.

Figure 9:
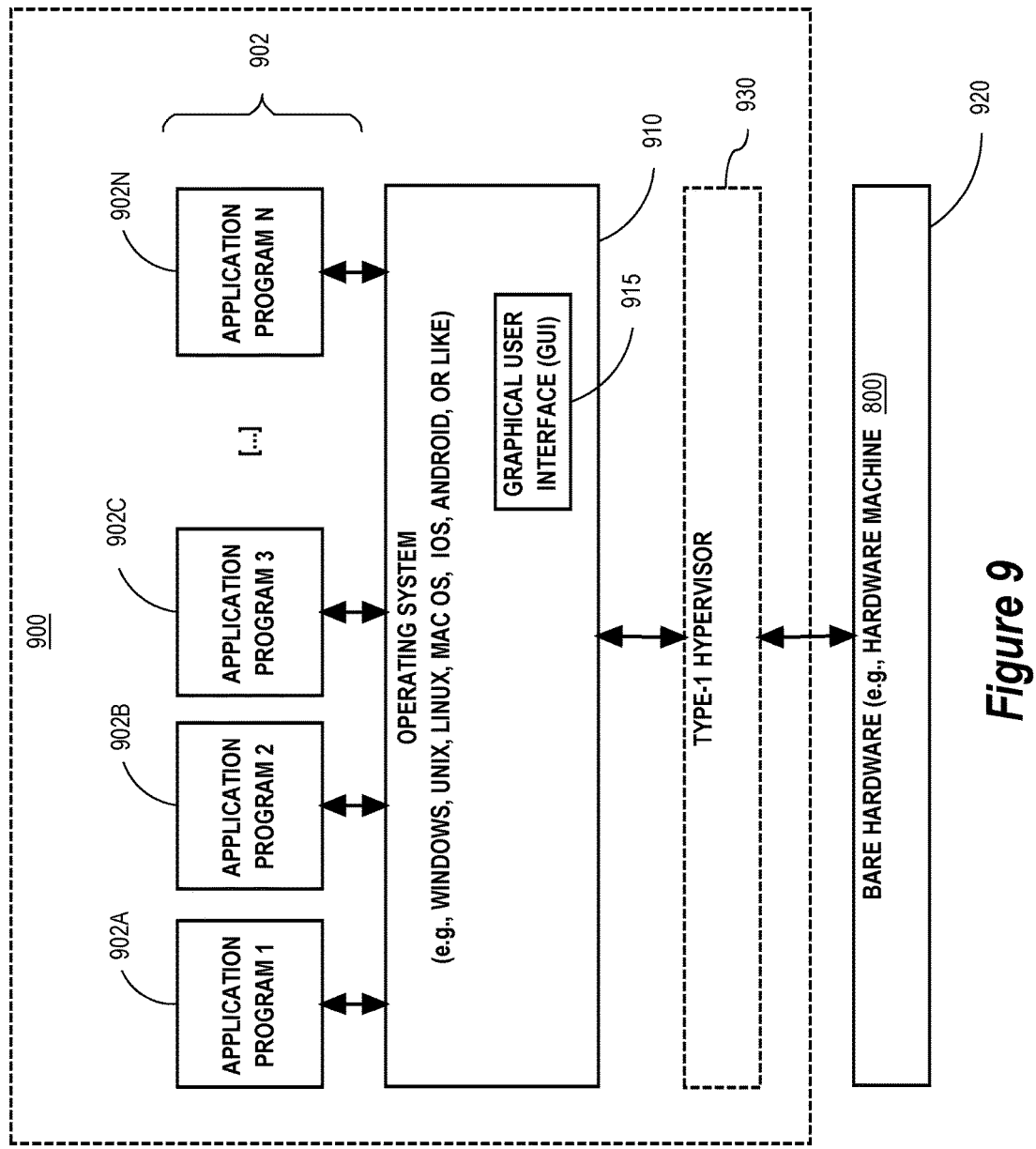
FIG. 9 illustrates a basic software system employed for controlling the operation of the hardware machine of FIG. 8 in some implementations of a large-scale asynchronous event processor.

FIG. 9 illustrates a basic software system 900 employed for controlling the operation of hardware machine 800 of FIG. 8 in some implementations of a large-scale asynchronous event processor. Software system 900 and its software components, including their connections, relationships, and functions, is meant to be exemplary only, and not meant to limit possible implementations of a large-scale asynchronous event processor. Other software systems suitable for an implementing of a large-scale asynchronous event processor may have different components, including components with different connections, relationships, and functions.

Software system 900 is provided for directing the operation of hardware machine 800. Software system 900 may be stored in system memory (RAM) 806 and on fixed storage (e.g., hard disk or flash memory) 810.

Software system 900 includes a kernel or operating system (OS) 910. OS 910 manages low-level aspects of computer operation, including managing execution of processes, memory allocation, file input and output (I/O), and device I/O.

Software system 900 includes one or more application programs, represented as 902A, 902B, 902C . . . 902N, that may be "loaded" (e.g., transferred from fixed storage 810 into memory 806) for execution by hardware machine 800. The applications or other software intended for use on hardware machine 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. GUI 915 also serves to display the results of operation from the OS 910 and applications 902, whereupon the user may supply additional inputs or terminate the session (e.g., log off).

Software system 900 can execute directly on bare hardware 920 (e.g., machine 800). Alternatively, a "Type-1" hypervisor 930 may be interposed between the bare hardware 920 and OS 910 as part of software system 900. Hypervisor 930 acts as a software "cushion" or virtualization layer between the OS 910 and bare hardware 920. Hypervisor 930 instantiates and runs one or more virtual machine instances. Each virtual machine instance comprises a "guest" operating system, such as OS 910, and one or more applications, such as applications 902, designed to execute on the guest operating system. Hypervisor 930 presents the guest operating systems with a virtual operating platform and manages the execution of the guest operating systems.

Hypervisor 930 may allow a guest operating system to run as if it is running on bare hardware 920 directly. In this case, the guest operating system as configured to execute on bare hardware 920 can also execute on hypervisor 930. In other words, hypervisor 930 may provide full hardware virtualization to the guest operating system. Alternatively, hypervisor 930 may provide para-virtualization to the guest operating system. In this case, the guest operating system is "aware" that it executes on hypervisor 930 and is specially designed or configured to execute on hypervisor 930.

Extensions and Alternatives

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various embodiments with various modifications as are suited to the particular use contemplated.

The invention claimed is:

1. A method performed by one or more computing devices for large-scale asynchronous event processing, the method comprising:
   receiving an event notification from an event source, the event notification having an identifier of an event domain, an identifier of an event subject within the event domain, and an event sequence value, the event sequence value ordering an event within the event domain and for the event subject with respect to other events within the event domain and for the event subject;
   publishing the event notification to a topic of a distributed streaming platform;
   consuming the event notification from the topic;
   determining a lambda topology configured to process the event notification based on the identifier of the event domain and the identifier of the event subject;
   determining a current cursor sequence value associated with the lambda topology, the current cursor sequence value representing a first set of events in the event domain and for the event subject that are successfully processed by the lambda topology;
   using the event sequence value of the event notification and the current cursor sequence value associated with the lambda topology to obtain, from the event source, a second set of events in the event domain and for the event subject that are not successfully processed by the lambda topology; and
   causing the second set of events to be processed by the lambda topology.

2. The method of claim 1, further comprising selecting the topic to which to publish the event notification based on the identifier of the event domain and the identifier of the event subject.

3. The method of claim 1, wherein the causing the second set of events to be processed by the lambda topology is based on en-queuing a job on a queue, the job including the second set of events; and wherein a worker process pulls the job from the queue and processes the second set of events.

4. The method of claim 1, wherein the lambda topology comprises a first lambda and a second lambda that is dependent on the first lambda according a configuration of the lambda topology; and wherein the causing the second set of events to be processed by the lambda topology is based on:
  en-queuing a first job on a first queue, the first job including the second set of events;
  wherein the en-queuing the first job on the first queue causes a first worker process to execute the first lambda and process the second set events;
  after the second set of events are successfully processed by the first lambda, en-queuing a second job on a second queue, the second job including the second set of events; and
  wherein a second worker process pulls the second job from a second queue and processes the second set of events.

5. The method of claim 4, wherein the first worker process and the second worker process are located in different data centers.

6. The method of claim 4, wherein the second job includes messages output by the first worker process as a result of executing the first lambda.

7. The method of claim 1, wherein the event pertains to a particular content item change in a centrally hosted network filesystem; wherein the identifier of the event subject identifies a content item namespace to which the particular content item belongs.

8. The method of claim 1, wherein:
  the lambda topology is a first lambda topology;
  a configuration of the first lambda topology specifies a dependency of the first lambda topology on a second lambda topology; and
  the causing the second set of events to be processed by the first lambda topology is based on causing the second set of events to be processed by the second lambda topology prior to the causing the second set of events to be processed by the first lambda topology.

9. The method of claim 1, further comprising:
  associating the lambda topology with a new current cursor sequence value based on lambda topology successfully processing the second set of events; and
  wherein the new current cursor sequence value is equal to the event sequence value of the event notification.

10. A system for large-scale asynchronous event processing, the system comprising:
  one or more processors;
  one or more storage media;
  one or more programs stored in the storage media and configured for execution by the one or more processors, the one or more programs comprising instructions configured for:
  receiving an event notification from an event source, the event notification having an identifier of a content item namespace and an event sequence value, the event sequence value ordering a content item change in the content item namespace with respect to other content item changes in the content item namespace;
  publishing the event notification to a topic of a distributed streaming platform;
  consuming the event notification from the topic;
  determining a lambda topology configured to process the event notification based on the identifier of the content item namespace;
  determining a current cursor sequence value associated with the lambda topology, the current cursor sequence value representing a first set of content item changes in the content item namespace that are successfully processed by the lambda topology;
  using the event sequence value and the current cursor sequence value to obtain, from the event source, a second set of content item changes in the content item namespace that are not successfully processed by the lambda topology; and
  causing the second set of content item changes to be processed by the lambda topology.

11. The system of claim 10, the instructions further configured for selecting the topic to which to publish the event notification based on the identifier of the content item namespace.

12. The system of claim 10, wherein the causing the second set of content item changes to be processed by the lambda topology is based on en-queuing a job on a queue, the job including the second set of content item changes; and wherein a worker process pulls the job from the queue and processes the second set of content item changes.

13. The system of claim 10, wherein the lambda topology comprises a first lambda and a second lambda that is dependent on the first lambda according a configuration of the lambda topology; and wherein the causing the second set of content item changes to be processed by the lambda topology is based on:
  en-queuing a first job on a first queue, the first job including the second set of content item changes;
  wherein the en-queuing the first job on the first queue causes a first worker process to execute the first lambda and process the second set content item changes;
  after the second set of content item changes are successfully processed by the first lambda, en-queuing a second job on a second queue, the second job including the second set of content item changes; and
  wherein a second worker process pulls the second job from a second queue and processes the second set of content item changes.

14. The system of claim 13, wherein the first worker process and the second worker process are located in different data centers.

15. The system of claim 13, wherein the second job includes messages output by the first worker process as a result of executing the first lambda.

16. The system of claim 10, wherein:
  the lambda topology is a first lambda topology;
  a configuration of the first lambda topology specifies a dependency of the first lambda topology on a second lambda topology; and
  the causing the second set of content item changes to be processed by the first lambda topology is based on causing the second set of content item changes to be processed by the second lambda topology prior to the causing the second set of content item changes to be processed by the first lambda topology.

17. The system of claim 10, the instructions further configured for:
  associating the lambda topology with a new current cursor sequence value based on lambda topology successfully processing the second set of content item changes; and
  wherein the new current cursor sequence value is equal to the event sequence value of the event notification.

18. One or more non-transitory computer-readable media storing one or more programs for execution by one or more processors, the one or more programs comprising instructions configured for:
  receiving an event notification from an database, the event notification having an identifier of a type of a database entity stored in the database, a unique identifier of the database entity in the database, and a revision identifier, the revision identifier ordering a data change to the database entity in the database with respect to other data changes to the database entity in the database;

publishing the event notification to a topic of a distributed streaming platform;

consuming the event notification from the topic;

determining a lambda topology configured to process the event notification based on the type of the database entity and the unique identifier of the database entity;

determining a current cursor sequence value associated with the lambda topology, the current cursor sequence value representing a first set of data changes to the database entity in the database that are successfully processed by the lambda topology;

using the revision identifier and the current cursor sequence value to obtain, from the database, a second set of data changes to the database entity in the database that are not successfully processed by the lambda topology; and causing the second set of data changes to be processed by the lambda topology.

19. The one or more non-transitory computer-readable media of claim 18, further comprising selecting the topic to which to publish the event notification based on the type of the database entity and the unique identifier of the database entity.

20. The one or more non-transitory computer-readable media of claim 18, wherein the causing the second set of data changes to be processed by the lambda topology is based on en-queuing a job on a queue, the job including the second set of data changes; and wherein a worker process pulls the job from the queue and processes the second set of data changes.

* * * * *